United States Patent [19]

Allan et al.

[11] Patent Number: 4,873,273

[45] Date of Patent: Oct. 10, 1989

[54] EPOXIDE COATING COMPOSITION

[75] Inventors: John L. Allan; Jeffery J. Boettcher, both of Neenah, Wis.; Norman G. Gaylord, New Providence, N.J.; Leon Katz, Norwalk, Conn.

[73] Assignee: James River-Norwalk, Inc., Norwalk, Conn.

[21] Appl. No.: 203,711

[22] Filed: Jun. 7, 1988

Related U.S. Application Data

[60] Continuation-in-part of Ser. No. 93,105, Aug. 31, 1987, abandoned, which is a division of Ser. No. 841,938, Mar. 20, 1986, Pat. No. 4,740,392.

[51] Int. Cl.$^4$ .......................... C08K 3/20; C08K 5/09
[52] U.S. Cl. .................................. 523/407; 523/409; 523/455
[58] Field of Search ................. 523/455, 407, 409

[56] References Cited

U.S. PATENT DOCUMENTS

| | | | |
|---|---|---|---|
| 4,026,862 | 5/1977 | Smith et al. | 523/442 |
| 4,302,373 | 11/1981 | Steinmetz | 523/409 |
| 4,740,536 | 4/1988 | Chao | 523/400 |

*Primary Examiner*—Joseph L. Schofer
*Assistant Examiner*—Peter D. Mulcahy
*Attorney, Agent, or Firm*—William A. Aguele; Thomas H. Whaley

[57] ABSTRACT

A thermosetting resin composition particularly suitable for surface coatings, including metals, paper and paperboard, and especially those papers subsequently converted into shaped paperboard products, e.g. paper plates and folded cartons, with a high gloss, water and oil resistant surface coating. The composition is suitable also as both an adhesive and coating in metallizing substrates by the transfer of metallic particles from a transfer agent to the substrate. When formulated without solvents or dispersants it is suitable for use as a casting composition or as a molding material. The composition comprises a polymer or copolymer containing carboxylic acid groups; an epoxy compound containing an average of more than one epoxide group per molecule; an ammonium or phosphonium base or salt thereof; and a monomeric carboxylic acid or inorganic acid which extends the useful working life of the composition and imparts a superior glass to the surface of the finished product.

7 Claims, No Drawings

EPOXIDE COATING COMPOSITION

This application is a continuation-in-part of our co-pending U.S. patent application Ser. No. 07/093,105 filed Aug. 31, 1987, now abandoned which, in turn, is a division of our U.S. patent application Ser. No. 841,938, filed Mar. 20, 1986 now Pat. No. 4,740,392.

This invention relates to a thermosetting epoxide composition. In one of its more specific aspects, this invention relates to a coating composition having an extended pot life and capable of imparting a high gloss to coated surfaces. In another of its more specific aspects, it relates to an epoxide composition useful as both a coating and an adhesive for transfer of a metal film from a transfer agent to a substrate. In still another of its specific aspects, this invention relates to a thermosetting epoxide composition having an extended shelf life which, in the absence of a solvent, is suitable for use as a casting composition or for injection molding of shaped articles. In another one of its more specific aspects, this invention relates to a method for producing water and oil resistant, high gloss surface coatings on a suitable substrate including, without limitation, metal surfaces, and printed or unprinted paper and paperboard.

Coated paperboard is widely used in disposable food service items, e.g. paper plates, and in a variety of other consumer products where a water-resistant coating is necessary or desirable, and in numerous packaging applications where product protection and appearance are important. Coated paper is widely used also in connection with such packaging, e.g. as a covering for uncoated paperboard packages, or as a covering for books, candies, etc. where appearance of the product is enhanced by a glossy surface. The appearance of the packaged product at the retail level is a well recognized important factor in market acceptance.

As examples of some of the above uses, many consumer products, ranging from foods, e.g. bakery products, ice cream, candies, frozen foods, juices, dairy products, meat, meat products, and the like, to personal care products, e.g. toothpaste, medications, skin creams, vitamins, cleansing tissue, personal hygiene products etc., are packaged in paperboard cartons. In most consumer packaging applications, high surface gloss is generally desirable, together with pleasing colors and graphics. High surface gloss may be obtained by overwrapping with a transparent plastic wrap or by coating the paper or paperboard with a flexible coating composition, the latter being generally preferred for most consumer product applications.

Various thermosetting resin compositions, including compositions comprising polymers or copolymers containing carboxylic acid groups, a polyfunctional epoxide and a quaternary ammonium hydroxide compound are known in the art. U.S. Pat. No. 4,458,040, for example, discloses a thermosetting aqueous coating resin composition for metals comprising an acrylic resin, an epoxy resin and an amine, where the composition has a excess of carboxyl groups as compared to oxirane groups, while U.S. Pat. No. 4,423,165 discloses a water-borne thermosetting polymer composition comprising an epoxide resin, a carboxyl-functional polymer, and a tertiary amine suitable as a coating for cans. U.S. Pat. No. 4,076,675, incorporated herein by reference, discloses a water-borne thermosetting composition which may be used as a paper coating comprising an epoxy polymer containing an average of 10 to 150 oxirane groups per molecule reacted with a tertiary amine and an alkylated amine resin or an alkylated amide resin sufficient for substantially complete consumption of the epoxy groups.

Methods for metallizing a substrate by transferring a metal film from a transfer surface to a substrate are known, per se. U.S. Pat. No. 4,382,831, for example, incorporated herein by reference, discloses a process for producing a metallic coating on a substrate, e.g. on paper or paperboard by first depositing a thin film of metal on a transfer surface, coating the substrate with an aqueous dispersion of a thermosetting resin, transferring the metal film from the transfer surface to the adhesive resin coated substrate, and curing the thermosetting resin to bond the metal film to the substrate.

Such compositions generally comprise a polymer or copolymer containing carboxylic acid groupings, a polyfunctional epoxide, and a quaternary ammonium hydroxide compound. The quaternary ammonium hydroxide, which is a strong base, acts as a catalyst for the crosslinking reactions between the carboxylic acid groupings and the epoxide. However, a common problem with such compositions is that the catalyst promotes the crosslinking reactions at low or ambient temperatures so that their useful lifetime, that is, the period during which the composition may be used prior to thermal cure, is limited.

We have now developed compositions of the general class as those described above which comprise at least one component selected from each of the following: (a) a polymer or copolymer containing carboxylic acid groupings; (b) an epoxy-compound containing on average more than one epoxide grouping; (c) a quaternary ammonium or quaternary phosphonium compound; and (d) a monomeric organic carboxylic acid, an inorganic acid, or both.

We have discovered that both the gloss of the finished coating and the useful working life of the compositions can be increased, unexpectedly, without significantly inhibiting the subsequent thermal cure by the addition of a monomeric acid to the formulation. These results were unexpected because, according to the literature, increasing the amounts of acidic components should reduce the effectiveness of the base catalyst and retard cross-linking during cure by heat.

The compositions disclosed are especially useful for coating metal and paper or paperboard which may be subsequently converted into shaped articles, e.g. cans, plates and cartons, by various pressing and folding operations. The compositions may be formulated without solvents for use in injection molding and casting processes and may be formulated with solvents or dispersants as coating compositions, or as adhesives.

Carboxyl-containing polymers useful in the compositions include polymers or copolymers of acrylic, methacrylic, fumaric, maleic, itaconic, mesaconic acid, and the like and esters thereof, optionally copolymerized or terpolymerized with one or more of the monomers selected from acrylamide, methacrylamide, allyl acetate, allyl alcohol, allyl phenyl ether, acrolein, methacrolein, acrylonitrile, methacrylonitrile, methoxystyrene, ethylene, propylene, butadiene, isoprene, styrene, vinyl acetate, vinyl methyl ether, vinyl isobutyl ether, vinyl chloride, vinylidene chloride, vinyl ethyl ketone, vinyl ethyl sulfide, vinyl propionate, 1-vinyl-2-pyrrolidone, and the like.

The epoxy compound forming a component of the composition may comprise one or more of the following: bisphenol-A diglycidyl ether and polymers thereof; halogenated bisphenol-A diglycidyl ether and polymers thereof; ethylene, propylene, and butylene glycol diglycidyl ethers and polymers thereof; glycidyl ethers of glycerol, trimethylol propane, pentaerythritol, and the like; diglycidyl ether; butadiene dioxide; dihydroxydiphenyl sulfone diglycidyl ether; epoxidized novolacs derived from phenol, resols, resorcinol, phloroglucinol, cashew nut phenol, and the like; triglycidyl isocyanurate; and epoxidized cyclohexenyl cyclohexenylacetate.

The quaternary ammonium or phosphonium component of the composition may be selected from the following quaternary ammonium and quaternary phosphonium compounds.

(i) COMPOUNDS OF THE STRUCTURE $R_4N^{\oplus}Y^{\ominus}$ or $R_4P^{\oplus}Y^{\ominus}$ wherein R may be the same or different, and is selected from the groups comprising alkyl, cycloalkyl, aryl, aralkyl, hydroxyethyl, hydroxypropyl, hydroxypoly(oxyethylene), hydroxypoly(oxypropylene), the radical —CH=CH—CH=CH—CH= (from pyridine), and the like.

The quaternary ammonium or phosphonium base may comprise, at least in part, the salt derived from the neutralization of the base with acid. Hence, $Y^{\ominus}$ in the above structure may be hydroxyl, or it may be an anion derived from an organic carboxylic acid, or from an inorganic acid, or a mixture of both. Examples of suitable acids include formic, acetic, octanoic, stearic, oxalic, malonic, succinic, adipic, maleic, benzoic, p-nitrobenzoic, o-phthalic, terephthalic, glycolic, lactic, amino-acetic, chloracetic, dichloroacetic, trichloroacetic, tartaric, citric, isocitric, malic, tartronic, methyl tartronic, p-toluenesulfonic, trifluoromethane sulfonic, carbonic, hydrochloric, sulfuric, phosphoric, methyl sulfuric, boric, and the like.

(ii) COMPOUNDS CONTAINING THE MOIETIES $R_3N^{\oplus}$—$CH_2CH(OH)CH_2$—$^{\oplus}NR_3$ $2Y^{\ominus}$, $R_3N^{\oplus}$—$(CH_2)_n$—$N^{\oplus}R_3$ $2Y^{\ominus}$, and

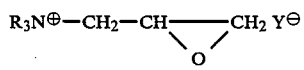

$R_3N^{\oplus}$—$CH_2$—$CH\underset{O}{\diagdown\diagup}CH_2$ $Y^{\ominus}$ wherein R and $Y^{\ominus}$ are defined in (i) above, and n is an integer.

(iii) COMPOUNDS CONTAINING THE MOIETIES $R^3N^{\oplus}$—$CH_2CH_2CO_2^{\ominus}$ and $R_3N^{\oplus}$—$CH_2CH_2CO_2H$ $Y^{\ominus}$ wherein R and $Y^{\ominus}$ are as defined in (i) above.

The monomeric acids contain the structure $H^{\oplus}Y^{63}$ wherein $Y^{\ominus}$ is the acid ion as defined in (i) above.

The preferred proportions of the components are as follows:

| The preferred proportions of the components are as follows: | |
|---|---|
| Carboxyl-containing copolymer (a) | 1.0 mole equiv. CO$_2$H |
| Epoxy-compound (b) | 0.5–5.0 mole equiv. epoxide |
| Quaternary ammonium base (c) | 0.05–2.0 mole equiv. R$_4$N$^{\oplus}$ |
| Monomeric acid (d) | At least 0.025 mole equiv. CO$_2$H |

The monomeric acids component of the composition may be selected from the group consisting of organic carboxylic acids containing 1 to 3 carboxylic acid groups per molecule, their anhydrides, hydrochloric acid and sulfuric acid. Acids from the above group have been found most useful in our coating compositions to extend the useful working life or pot life of the coating compositions without significant adverse effect on their thermal cure or gloss.

Particularly preferred organic carboxylic acids are aliphatic acids containing 1 to 24 carbon atoms. Examples of such acids are formic acid, acetic acid, dichloroacetic acid, trichloroacetic acid, malic acid, alanine, tartaric acid, lactic acid, citric acid, maleic anhydride, succinic acid and adipic acid.

Aromatic monocarboxylic and dicarboxylic acids including benzoic acid and terephthalic acid are also effective in imparting useful pot life to the coating compositions of this invention. Monocyclic aromatic acids are particularly effective.

Hydrochloric and sulfuric acid are the inorganic acids which have proven effective in enhancing the useful life of epoxy-carboxyl acid containing polymer compositions of our invention.

The components can be used without dilution, or they may be dissolved or dispersed in water or in an organic solvent. Suitable solvents may include reactive diluents, e.g., monofunctional epoxides, or high boiling solvents or plasticizers which remain within the composition after cure. Alcohols, which can react slowly with both epoxides and acids, are also suitable as diluents.

The monomeric acid improves both shelf life and gloss of the coating as demonstrated in Table 1 below, the beneficial effects in general increasing with increased amounts of this component. A range of monomeric acid to carboxyl groups in the copolymer of 0.1 to 10 is useful with a preferred range of 0.2 to 5 for the highest gloss coatings.

Components which function as leveling agents, slip aids, release agents, matting agents, colorants, dispersing aids, emulsifying agents, and the like may also be included.

EXAMPLES 1–5

Coating solutions having the formulations summarized in Table 1 were made up as follows:

A solution of half esters of a styrene/maleic anhydride copolymer having a styrene/maleic anhydride ratio of 1 and sold under the trade name SMA 1000 by Arco Chemical Company, 1500 Market Street, Philadelphia, PA 19101, was made up by dissolving the copolymer (I) (643 g.; acid value, 480 mg KOH/g) in a mixture of isopropanol (129 g) and methanol (841 g) containing sodium hydroxide (5 g). To portions of this polymer solution (12.57 g, containing 21.4 mmole carboxyl groups), a solution of di(hydrogenated tallo) dimethylammonium chloride sold under the trade name ARQUAD 2HT-75 by Akzo Chemie America, 300

South Wacker Drive, Chicago, Ill. 60606 (75% by weight in isopropanol; 2.57 g, containing 3.3 mmole quaternary ammonium compound) was added, followed by sodium hydroxide solution (10% by weight in methanol; 0.8 g). This effectively generates the quaternary hydroxide (II) (3.3 mmole) in the polymer solution, which reacts with the carboxylic acid groupings present or subsequently introduced. To each portion of these solutions there was then added, with thorough mixing, varying amounts of glacial acetic acid (III) as shown in Table 1 (Compositions A through E), followed by bisphenol-A diglycidyl ether (IV) (Araldite 6010, Ciba-Geigy; 4.0 g; 21.4 mmole). The solid nonvolatile content of the solution is then approximately 56 percent by weight.

The compositions were then applied to lithographically printed, clay coated board using a hand-held engraving roll (120 Quad), and the coated boards were cured in a forced air oven set to raise the temperature of the coated surface to 300° F.(149° C.) in 30 seconds. The dry film weight applied was about 1.9 lb/3000 ft² ream.

The results of tests on the coating compositions A-E and on the coated, cured boards are summarized in Table 1. As can be seen as the amount of monomeric acid (d) is increased, the pot life of the compositions increases, but the degree of cure as measured by the cured film performance in the heat test does not change significantly. All the clear, cured films had a high gloss and were odorless.

TABLE 1

Composition
Carboxyl-containing copolymers (I), 21.3 mmole, 1.0 mole equiv.
Quaternary ammonium hydroxide (II), 3.3 mmole, mole equiv.
Epoxide (IV), 21.3 mmole, 1.0 mole equiv. in methanol/isopropanol

| Test Results | Example No. | | | | |
|---|---|---|---|---|---|
| | 1 | 2 | 3 | 4 | 5 |
| Acetic Acid (III) (mole equiv.) | 0.0 | 0.1 | 0.2 | 0.3 | 0.45 |
| pH (Note A) | 4.6 | 4.1 | 3.9 | 3.8 | 3.7 |
| Pot Life (days) (Note B) | 3.5 | 4.0 | 5.0 | 5.5 | 6.5 |
| Heat Resistance (Note C) | A | A | A | A | A |
| Gloss (Note D) | 66 | 68 | 70 | 75 | 71 |

NOTES:
(A) Measured pH on 33% dispersion in distilled water at ca. 25° C.
(B) Days after which the composition becomes unpourable at room temperature.
(C) Cured, coated boards (2 × 4"), conditioned to contain 10% w/w water, were pressed at 250 and 600 psig between wrought iron bars of a Sentinel Heat sealer heated to 300° F. (149° C.) for two seconds. Ratings: A, falls off bar when bars separate; B, slight sticking, requiring gentle tap of board to remove from opened bars; through E, severe sticking and detachment of coating on to heated bar.
(D) Gloss of cured coated surface measured with a Hunter reflectometer at 20° at ambient temperature.

EXAMPLE 6

A coating composition was prepared from a styrene/acrylic acid copolymer having an acid value of 200 mg KOH/g sold under the trade name JONCRYL 67 by S. C. Johnson & Son, Inc., 1525 Howe Street, Racine, WI 53403 by dissolving and thoroughly mixing each of the following components in the order listed below.

| Component | Grams |
|---|---|
| Styrene/acrylic acid copolymer | 750 |
| Isopropanol | 994 |
| Di (hydrogenated tallow) dimethylammon- | 207 |

| Component | Grams |
|---|---|
| ium chloride (75% in isopropanol) | |
| Acetic Acid | 50 |
| Bis-phenol A diglycidyl ether (Epoxide value, 0.535 equiv./100 g) | 500 |

This solution was coated continuously onto printed board with a flexographic printing unit at a dry resin weight of about 3.0 lb/3000 ft³ ream. The coating on litho-printed board having a basis weight of 200 lb/3000 ft ream was cured by continuous feed at 130 feet per minute through an oven such that the surface of the board attained a temperature of 300° F. after 13 seconds residence.

At this stage the coated surface had a gloss (20° Hunter) of 93 and was rated A in the heat test described in Example 1.

The roll of coated board was next run through a spray of water such that the water content of the moisturized board in the rollup was 9–11%. The board was then fed to a press which molded plates at elevated temperature and high pressure. The resulting plates had a gloss rating (20° Hunter) of 86. The plates were completely impermeable to water and to hot oil. No objectional odors were detected when the plates were heated for a prolonged period in a plastic enclosure, nor when they were heated in a microwave oven.

A sample of the original coating solution was still pourable after 7 days at ambient temperature and was dilutable with isopropanol.

The coating compositions are capable of producing excellent glossy finish coatings on paper for subsequent decorating when applied at a rate in the range of about 1 to about 7 pounds dry resin coating weight per ream (3000 square feet). When the coating compositions are applied to paperboard, the preferred coating rate is in the range of 0.7 to 5 pounds dried resin weight per ream of 3000 square feet.

EXAMPLES 7–9

A solution of half esters of a styrene/maleic anhydride copolymer (I) having a styrene/maleic anhydride ratio of 1 and sold under the trade name SMA 1000 by Arco Chemical Company, Philadelphia, PA, was made up by dissolving the copolymer (I) (643 g; acid value, 480 mg KOH/g) in a mixture of isopropanol (129 g) and methanol (84.1 g) containing sodium hydroxide (8.7 g). To portions of this polymer solution (12.57 g, containing 21.4 mmole carboxyl groups), solutions of different quaternary ammonium compounds (2.2 mmole) were introduced (Table 3). To each portion of these solutions, glacial acetic acid (IV) (0.47 g, 7.8 mmole) was added with thorough mixing, followed by bisphenol-A diglycidyl ether (V) (Araldite 6010, Ciba-Geigy, Ardsley, NY; 4.00 g; 21.4 mmole) with further mixing. The solutions were applied to clay-coated board and cured as in Examples 1–5. The results of tests on the coating compositions are summarized in Table 2.

TABLE 2

Composition
SMA-1000, 21.4 mmol, 1.0 mole equiv.
Quaternary ammonium compound, 2.2 mmole, 0.10 mole equiv.
Acetic acid (IV), 7.8 mmole, 0.36 mole equiv.
Araldite 6010 (V), 21.4 mmole, 1.0 mole equiv.
Quaternary Ammonium Compounds

TABLE 2-continued

| Example | Component | Trade Name | Supplier |
|---|---|---|---|
| 7 | N,N,N',N',N'—Pentamethyl-N—tallow-1,3-propanediammonium dichloride | Duoquad T-50 | Akzo Chemie |
| 8 | Dialkybis(polyoxyethylene) quaternary ammonium borate | RD-5444A | Akzo Chemie |
| 9 | N,N,N',N'-Penta (2-hydroxyethyl) N—tallow-1,3-propanediammonium dianion | Ethoduoquad R-15/50 | Akzo Chemie |

Test Results

| Example | Pot Life (Note A) | Heat Resistance (Note B) | Gloss (Note C) |
|---|---|---|---|
| 7 | 4 | B | 73 |
| 8 | 4 | B | 84 |
| 9 | 4 | B | 73 |

NOTES:
(A) Days after which the composition becomes unpourable at room temperature.
(B) Cured, coated boards (2 × 4"), conditioned to contain 10% w/w water, were pressed at 250 psig for two seconds between wrought iron bars of a Sentinel Heat Sealer heated to 300° F. (149° C.). Ratings: A, falls off bar when bars separate; B, slight sticking, requiring gentle tap of board to remove from opened bars; through E, severe sticking and detachment of coating on to heated bar.
(C) Gloss of cured coated surface measured with a Hunter reflectometer at 20° at ambient temperature.

EXAMPLES 10 and 11

A solution of SMA-1000 (I) was prepared in methanol/isopropanol as in Examples 7–9. To portions of this solution (12.57 g, containing 21.4 mmole carboxyl groups) there was added Arquad 2HT-75 (II) (2.56 g, containing 3.3 mmole of quaternary ammonium compound) followed by glacial acetic acid (IV) (0.47 g, 7.8 mmole) and Araldite 6010 (V) (4.80 g, 25.7, 1.20 mole equiv.) with thorough mixing. To the different portions there was then added with thorough mixing the following epoxides supplied by Interez, Inc., of Louisville, KY: Epi-Rez SU-3 (2.40 g, 12.3 mmole epoxide, 0.57 mole equiv.) an epoxide with a functionality of 3 and an epoxide content of 0.512 equiv./100 g; and Epi-Rez 540-C (2.4 g, 0.75 mmole epoxide, 0.035 mole equiv.) a partially polymerized bisphenol-A diglycidyl ether with an epoxide content of 0.0625 equiv./100 g.

The compositions were applied to clay-coated boards and cured as in Examples 1–5. The results on coating compositions are summarized in Table 3.

TABLE 3

Composition
SMA-1000, 21.4 mmole, 1.0 mole equiv.
Arquad 2HT-75 (II), 3.3 mmole, 0.15 mole equiv.
Acetic acid (IV), 7.8 mmole, 0.36 mole equiv.
Araldite 6010 (V), 21.4 mmole, 1.0 mole equiv.

| Example | Epoxides (mole equiv.) | Epoxide (Trade Name) |
|---|---|---|
| 10 | 1.77 | Epi-Rez SU-3 |
| 11 | 1.24 | Epi-Rez 540-C |

Test Results

| Example | Pot Life (Note A) | Heat Resistance (Note B) | Gloss (Note C) |
|---|---|---|---|
| 10 | 7 | A | 68 |
| 11 | 9 | A | 66 |

NOTES:
(A) Days after which the composition becomes unpourable at room temperature.
(B) Cured, coated boards (2 × 4"), conditioned to contain 10% w/w water, were pressed at 250 psig for two seconds between wrought iron bars of a Sentinel Heat Sealer heated to 300° F. (149° C.). Ratings: A, falls off bar when bars separate; B, slight sticking, requiring gentle tap of board to remove from opened bars; through E, severe sticking and detachment of coating on to heated bar.
(C) Gloss of cured coated surface measured with a Hunter reflectometer at 20° at ambient temperature.

EXAMPLES 12–16

A solution of Joncryl 67 (V) was prepared in ethanol. To portions of this polymer solution (12.0 g, containing 21.4 mmole of carboxyl groups), a solution of choline (45% w/w in methanol; 0.59 g; 2.2 mmole) was added with thorough mixing. To each of these solutions, 2.2 mmole of a monomeric acid was introduced (Table 4, Examples 12–15), followed by Araldite 6010 (4.0 g; 21.4 mmole) with further mixing. A control, to which no monomeric acid was added, was included for comparison (Example 16).

The solutions were applied to clay-coated board and cured as in Examples 1–5. The results of tests on the coating compositions are summarized in Table 4.

TABLE 4

Composition
Joncryl 67 (VI), 21.4 mmole, 1.0 mole equiv.
Choline, 2.2 mmol, 0.10 mole equiv.
Monomeric acid, 2.2 mmole, 0.10 mole equiv.
Araldite 6010 (V), 21.4 mmole, 1.0 mole equiv.

Test Results

| Example | Monomeric Acid |
|---|---|
| 12 | Acetic acid |
| 13 | Sulfuric acid |
| 14 | Dodecylbenzene sulfonic acid |
| 15 | Hydrochloric acid (37.3% w/w) |
| 16 | No acid |

| Example | Pot Life (Note A) | Heat Resistance (Note B) | Gloss (Note C) |
|---|---|---|---|
| 12 | 4 | A | 79 |
| 13 | 4 | B | 73 |
| 14 | 5 | C | 73 |
| 15 | 4 | A | 77 |
| 16 | 1 | A | 76 |

NOTES:
(A) Days after which the composition becomes unpourable at room temperature.
(B) Cured, coated boards (2 × 4"), conditioned to contain 10% w/w water, were pressed at 250 psig for two seconds between wrought iron bars of a Sentinel Heat Sealer heated to 300° F. (149° C.). Ratings: A, falls off bar when bars separate; B, slight sticking, requiring gentle tap of board to remove from opened bars; through E, severe sticking and detachment of coating on to heated bar.
(C) Gloss of cured coated surface measured with a Hunter reflectometer at 20° at ambient temperature.

EXAMPLES 17–23

A solution of SMA 1000 (I) was prepared in methanol. To portions of this polymer solution (10.0 g, containing 21.4 mmole of carboxyl groups), a solution of choline (45% w/w in methanol; 0.59 g; 2.2 mmole) was added with thorough mixing. To these solutions, 2.2 mmole of a monomeric acid was introduced, followed by Araldite 6010 (4.00 g; 21.4 mmole) with further mixing.

The solutions were applied to clay-coated board and cured as in Examples 1–5. The results of tests on the coating compositions are summarized in Table 5.

TABLE 5

Composition
SMA-1000, 21.4 mmole, 1.0 mole equiv.
Choline, (II), 2.2 mmole, 0.1 mole equiv.
Monomeric acid, 2.2 mmole, 0.1 mole equiv. (All supplied by J.T. Baker Chemical Co., Phillipsburg, NJ)
Araldite 6010 (V), 21.4 mmole, 1.0 mole equiv.

Test Results

| Example | Component |
|---|---|
| 17 | Malic Acid |
| 18 | Lactic Acid |
| 19 | Trichloroacetic Acid |
| 20 | Tartaric Acid |
| 21 | Terephthalic Acid |

TABLE 5-continued

| | 22 | Maleic Anhydride | |
| | 23 | Alanine | |

| Example | Pot Life (Note A) | Heat Resistance (Note B) | Gloss (Note C) |
|---|---|---|---|
| 17 | 4 | A | 74 |
| 18 | 4 | B | 67 |
| 19 | 6 | A | 75 |
| 20 | 4 | A | 64 |
| 21 | 4 | A | 63 |
| 22 | 3 | B | 70 |
| 23 | 4 | B | 62 |

NOTES:
(A) Days after which the composition becomes unpourable at room temperature.
(B) Cured, coated boards (2 × 4"), conditioned to contain 10% w/w water, were pressed at 250 psig for two seconds between wrought iron bars of a Sentinel Heat Sealer heated to 300° F. (149° C.). Ratings: A, falls off bar when bars separate; B, slight sticking, requiring gentle tap of board to remove from opened bars; through E, severe sticking and detachment of coating on to heated bar.
(C) Gloss of cured coated surface measured with a Hunter reflectometer at 20° at ambient temperature.

EXAMPLES 23-29

A solution of SMA 1000 (I) was prepared as in Examples 7 to 9. To portions of this solution (12.57 g containing 21.4 mmole of carboxyl groups) a solution of Arquad 2HT-75 (II) (75% by weight in isopropanol; 2.57 g, containing 3.3 mmole quaternary ammonium compound) was added. A monomeric acid was added to each solution (acid identity and concentration in mole equiv. in Table 6, followed by Araldite 6010 (4.00g; 21.4 mmole) with thorough mixing.

The test solutions were applied to clay-coated board and cured as in Examples 1-5. The results of tests on the coating compositions are summarized in Table 6.

TABLE 6

Composition
SMA-1000 (I), 21.4 mmole, 1.0 mole equiv.
Arquad 2HT-75 (II), 3.3 mmole, 0.15 mole equiv.
Monomeric acid, concentration as noted (all supplied by J. T. Baker Chemical Co.)
Araldite 6010 (V), 21.4 mmole, 1.0 mole equiv.
Test Results

| Example | Monomeric Acid | Concentration (mole equiv. CO$_2$H) |
|---|---|---|
| 23 | Adipic Acid | 0.5 |
| 24 | Succinic Acid | 0.5 |
| 25 | Citric Acid | 0.5 |
| 26 | Adipic Acid/Acetic Acid | 0.5/0.35 |
| 27 | Benzoic Acid | 0.35 |
| 28 | Dichloroacetic Acid | 0.15 |
| 29 | Trichloroacetic Acid | 0.15 |

| Example | Pot Life (Note A) | Heat Resistance (Note B) | Gloss (Note C) |
|---|---|---|---|
| 23 | 6 | B | 87 |
| 24 | 7 | A | 88 |
| 25 | 12 | B | 83 |
| 26 | 9 | B | 85 |
| 27 | 5 | A | 82 |
| 28 | 9 | A | 78 |
| 29 | 8 | A | 81 |

NOTES:
(A) Days after which the composition becomes unpourable at room temperature.
(B) Cured, coated boards (2 × 4"), conditioned to contain 10% w/w water, were pressed at 250 psig for two seconds between wrought iron bars of a Sentinel Heat Sealer heated to 300° F. (149° C.). Ratings: A, falls off bar when bars separate; B, slight sticking, requiring gentle tap of board to remove from opened bars; through E, severe sticking and detachment of coating on to heated bar.
(C) Gloss of cured coated surface measured with a Hunter reflectometer at 20° at ambient temperature.

EXAMPLES 30-32

A solution of half esters of SMA 1000 was made up by dissolving the copolymer (I) (497 g) in a mixture of isopropanol (99 g) and methanol (433 g) containing sodium hydroxide (4 g). To a portion of this solution (52 g, containing 107.2 mmole carboxyl groups), a solution of Arquad 2HT-75 (II) (8.58 g, containing 11.0 mmole quaternary ammonia compound) was added with thorough mixing. To the resultant solution, there were added, with further mixing, glacial acetic acid (1.98 g, 33.0 mmole) and Araldite 6010 (V) (20.0 g, 107.2 mmole). The solid, non-volatile content of the solution was approximately 63% by weight. A second solution, diluted to approximately 55% by weight, was made as above. The compositions were then applied to cold-rolled steel test panels (ASTM Spec. D609.38; Type QD; Q-Panel Company, Cleveland, OH) using an adjustable drawn-down rod to lay down films approximately 5 and 10 mils wet thickness. The coated test panels were placed in a 150° C., still-air oven to cure for time periods given in Table 7.

The results of the tests on the coated steel test panels are summarized in Table 7.

TABLE 7

| Example | Coating Solids (Weight %) | Film Thickness (Wet, mils) | Cure (Note A) (Minutes) |
|---|---|---|---|
| 30 | 62.5 | 5 | 5 |
| 31 | 62.5 | 5 | 10 |
| 32 | 55.0 | 10 | 10 |

| Example | Gloss Hunter | (Note B) Dorigan | MEK (Note C) | Hardness (Note D) | Flex (Note E) | Adhesion (Note F) |
|---|---|---|---|---|---|---|
| 30 | 128 | 3.0 | B | >4 | ⅛ | 3 |
| 31 | 140 | 2.7 | A | >4 | 1/16 | 5 |
| 32 | 124 | 1.8 | A | >4 | ⅛ | 10 |

NOTES:
(A) Cure time: Time coated test panel is heated in a still-air oven at 150° C.
(B) Gloss: Hunter - 20° gloss; Hunterlab Model D16; Hunter Associates Laboratory, Reston, VA, Dorigan - Specular Reflectance (R$^2$); Model D47-6; Hunter Associates Laboratory, Reston, VA.
(C) MEK Resistance: Film resistance to breakdown by rubbing under heavy pressure with MEK-soaked cloth. A--no visible breakdown; B--slight marking.
(D) Pencil Hardness: Coating resistance to disruption (fracture) by the point of a pencil. A ration >4 means that a No. 4 hardness pencil could not mark the film.
(E) Flex: Flexibility, measured as diameter (inches) of the mandrel the coated surface can be bent over without breaking.
(F) Adhesion: After cross-hatching the film with a razor blade, adhesion is rated as the lift off of coating by cellophane tape (Grade 610, 3M, St. Paul, MN) in the cross-hatched area. 0 = total coating lift off; 10 = no coating lift off.

EXAMPLE 33

A solution of SMA-1000 in methanol/isopropanol was prepared as in Examples 7-9. To a portion of this solution (20.23 g, containing 38.75 mmole carboxyl groups) there was added tetrabutylphosphonium chloride (TBPC) (1.71 g, 5.81 mmole, 0.15 mole equiv.) from Aldrich, glacial acetic acid (IV) (0.81 g, 13.50 mmole, 0.35 mole equiv.), and Araldite 6010 (V) (7.25g, 38.75 mmole, 1.00 mole equiv.) with thorough mixing.

The solution was applied to clay-coated board and cured as in Examples 1-5. The results of tests are summarized in Table 8.

TABLE 8

Composition
SMA-1000 (I), 38.75 mmole, 1.0 mole equiv.
TBPC (II), 5.81 mmole, 0.15 mole equiv.
Acetic acid (IV), 13.5 mmole, 0.35 mmole equiv.
Araldite 6010 (V), 38.75 mmole, 1.0 mole equiv.
Results

| Catalyst | Pot Life (Note A) | Heat Resistance (Note B) | Gloss (Note C) |
|---|---|---|---|
| Tetrabutylphosphonium | 5 | A | 81 |

TABLE 8-continued chloride

NOTES:
(A) Days after which the composition becomes unpourable at room temperature.
(B) Cured, coated boards (2 × 4"), conditioned to contain 10% w/w water, were pressed at 250 psig for two seconds between wrought iron bars of a Sentinel Heat Sealer heated to 300° F. (149° C.). Ratings: A, falls off bar when bars separate; B, slight sticking, requiring gentle tap of board to remove from opened bars; through E, severe sticking and detachment of coating on to heated bar.
(C) Gloss of cured coated surface measured with a Hunter reflectometer at 20° at ambient temperature.

We claim:

1. A one part self-curing thermosetting resin composition having extended pot life which consists of the following components:
   (a) a polymer or copolymer containing carboxylic acid groupings;
   (b) an epoxy-compound containing on average more than one epoxide grouping;
   (c) a quaternary ammonium or quaternary phosphonium compound; and
   (d) a monomeric acid selected from the group consisting of hydrochloric acid, sulfuric acid, and organic carboxylic acids containing 1 to 3 carboxylic acid groupings per molecule and their anhydrides,
wherein the mole ratio of expoxide groupings in the epoxy component (b) to carboxylic acid groupings in the polymeric component (a) is in the range of 0.5 to 5; the mole ratio of the quaternary ammonium or quaternary phosphonium moiety of the base to carboxylic acid groupings in the polymeric component is in the range of 0.05 to 2, and said monomeric acid component (d) is present in the composition in an amount in the range of 0.02 to 5 moles for each mole of carboxylic acid grouping contained in component (a).

2. A composition according to claim 1 wherein said monomeric acid is an aliphatic acid containing 1 to 24 carbon atoms.

3. A composition according to claim 2 wherein said aliphatic acid is acetic acid.

4. A composition according to claim 1 wherein said monomeric acid is hydrochloric acid.

5. A composition according to claim 1 wherein said monomeric acid is a monocyclic aromatic acid containing 1 or 2 di-carboxylic acid groupings.

6. A composition according to claim 1 wherein said polymeric component (a) consists of esters of a styrene/maleic anhydride copolymer.

7. A composition according to claim 1 wherein said polymeric component (a) is a styrene/acrylic acid copolymer.

* * * * *